Patented Jan. 31, 1939

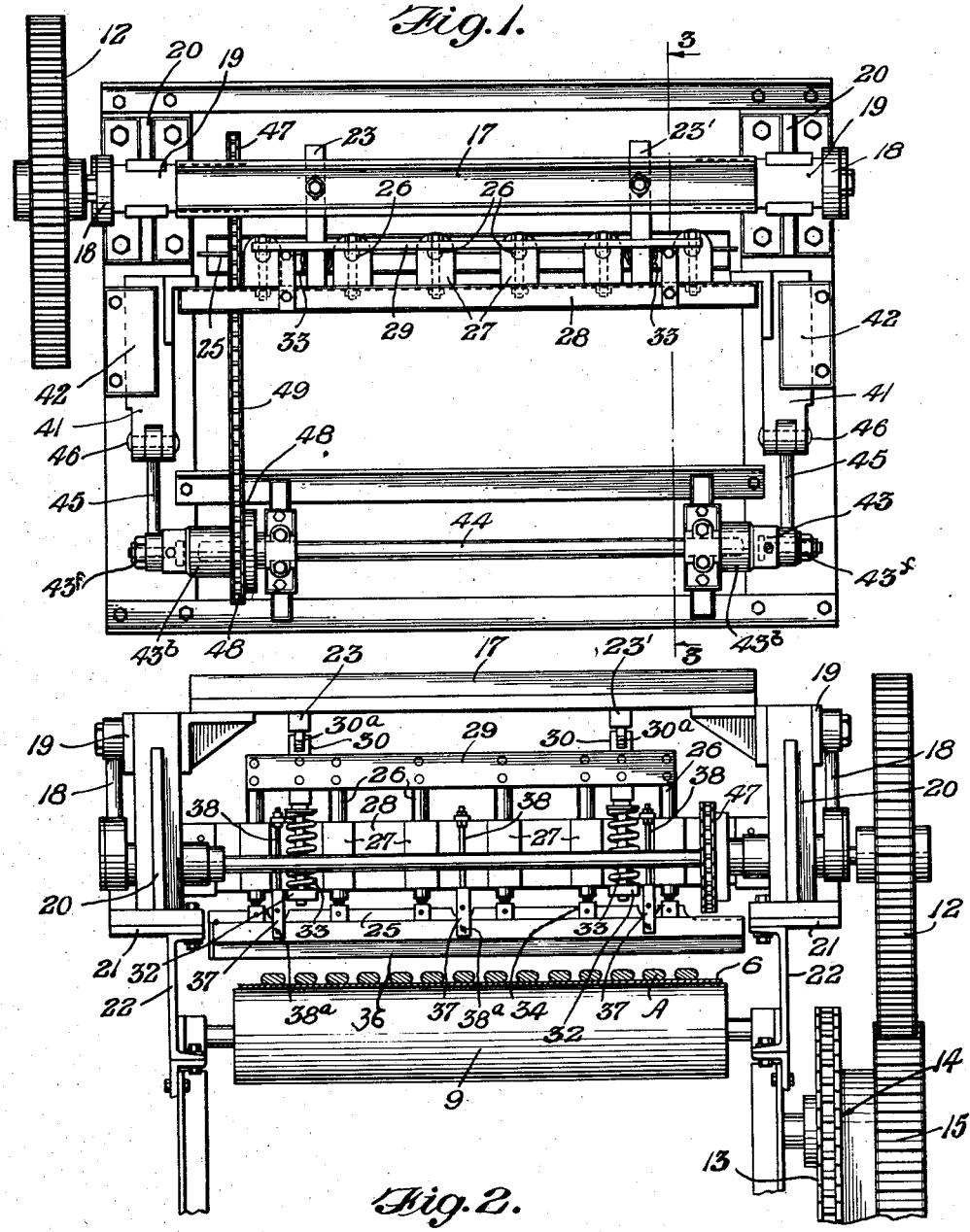

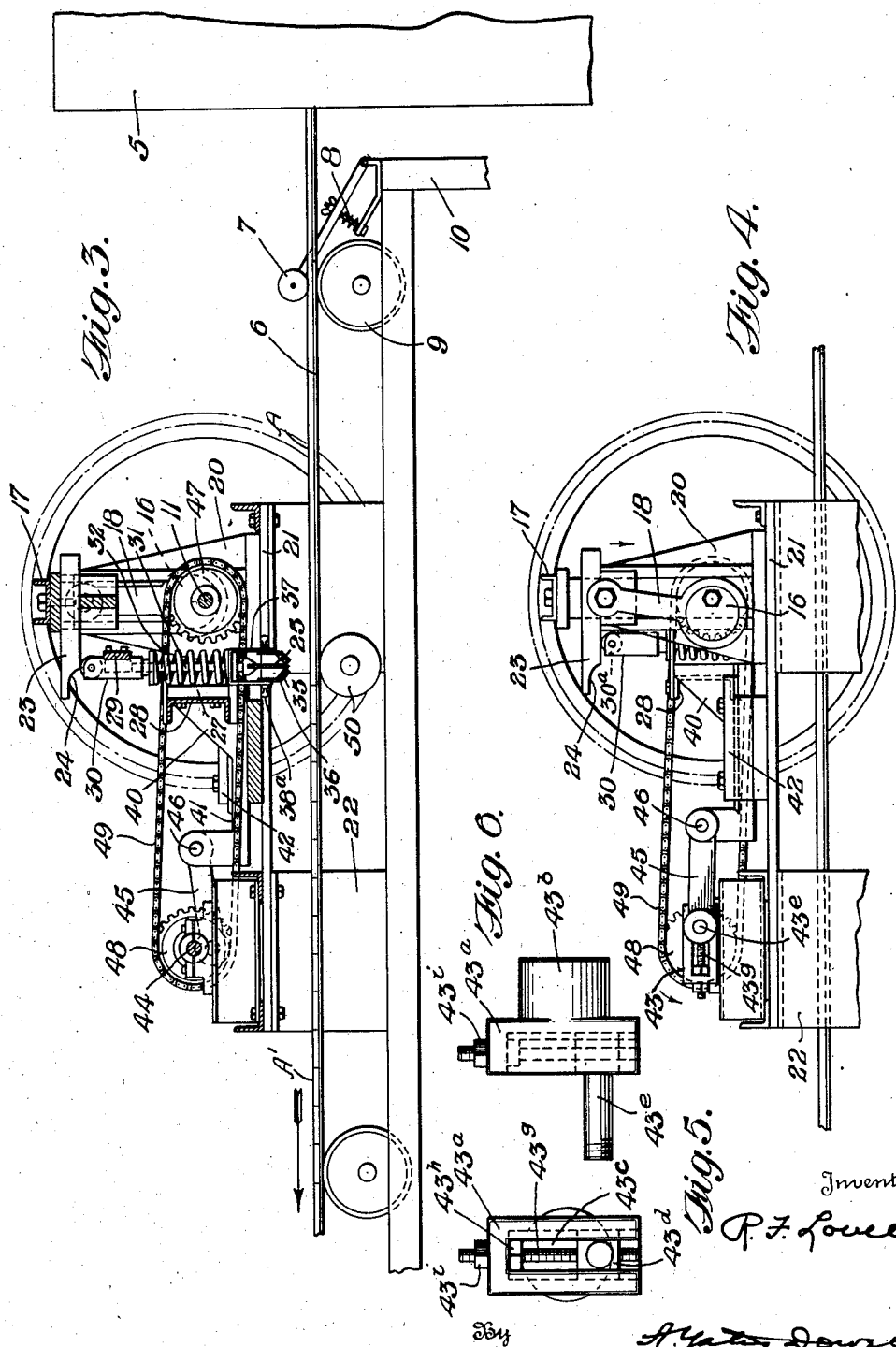

2,145,770

UNITED STATES PATENT OFFICE 2,145,770

MACHINE FOR SEVERING PLASTIC MATERIALS

Robert F. Lovell, Cincinnati, Ohio, assignor to The Kroger Grocery & Baking Company, Cincinnati, Ohio, a corporation of Ohio Application September 16, 1936, Serial No. 101,152

10 Claims. (Cl. 107—21)

This invention relates to cutting or severing mechanism broadly, and more particularly to mechanism for severing relatively soft or plastic materials into uniform lengths during travel thereof, as for example, where it is desired to segregate baked or unbaked material in uniform portions in connection with a continuous band oven in the baking industry.

This latter operation is illustrative of certain problems which are encountered in the baking art. To illustrate, in the production of fig bars, the dough and the fig center are fed from separate hoppers arranged side by side through a molder in such a manner that a series of continuous ribbons or fig bars are formed with the fig filler in the center surrounded by the dough. In most instances the molder is designed to feed a plurality of these ribbons simultaneously onto a section of belt conveyor which in turn transfers the bars to an endless steel band which travels through an oven wherein the material is baked, the band being trained over steel drums spaced to allow a suitable travel distance for cooling and subsequent operations on the bars after leaving the oven. Since the bars must be maintained in substantial alignment on the band and since also the cutting movement of the knife must be substantially synchronized with the travel of the bars in order to obtain a clean and uniform segregating or severing operation, it is essential that the material be severed in a manner such as not to cause the bars to adhere to and jump or be raised from the band when the knife is retracted, and also that the actual cutting operation take place during a certain predetermined period in the cycle of the cutting mechanism. It will thus be seen that the problem becomes more or less complicated, especially when the sticky freshly baked mass in the center of the bar is taken into consideration.

The present improved cutting mechanism has effectively overcome the problems above noted in that it operates to sever the material cleanly and in uniform lengths without jarring or disrupting the alignment of the material on the band and may be readily synchronized or adjusted so that the actual cutting operation takes place at the proper phase of the cutting cycle. While the present mechanism or machine has been primarily designed for use in severing baked materials and more particularly those having plastic centers, it will be understood that it could be used with equal facility in other installations where similar or substantially similar problems are encountered.

In the drawings:

Fig. 1 is a view in plan of a machine embodying the features of the present invention.

Fig. 2 is a view in end elevation thereof.

Fig. 3 is a longitudinal sectional view taken substantially on the line 3—3 of Fig. 1, a portion of a band oven and coacting parts being shown more or less diagrammatically in this figure.

Fig. 4 is a view in side elevation of the machine.

Figs. 5 and 6 are detailed views of a preferred type of adjustable cam or crank member which forms an important part of the mechanism.

Referring to the drawings in detail, in Fig. 3 a band oven is diagrammatically illustrated at 5, and an endless steel band for conveying the baked materials at 6, which band is shown as moving in the direction of the arrow at the left hand portion of this figure. The plastic material which is being severed in this instance consists of a series of fig bars, the unsevered strip of bars being indicated at A and the severed or segregated bars being indicated at A'. As heretofore noted, these bars are molded in a plurality of substantially parallel strips or lengths (note Fig. 2) which are automatically positioned on the band in alignment, and the cutting mechanism operates to sever or segregate these lengths into uniform portions after they leave the band oven, or after baking thereof. Just beyond the oven, a roller 7 is mounted and is adjustable through the medium of tension member or spring 8 to maintain the bars of uniform thickness, a supporting roller 9 being located beneath the band 6 in cooperative relation with the roller 7. A fragment of the main supporting frame is generally indicated at 10.

The machine proper comprises a main drive shaft 11 which has secured on one end thereof a gear 12, the drive in the present instance being taken from a suitable driving member (not shown) rotating in synchronism with the band oven, through the medium of a sprocket chain 13, sprocket gear 14 and gear 15 in mesh with gear 12. Mounted on the opposite ends of the main drive shaft 11 are cams 16 which impart vertical reciprocation to a cross head or bar 17 through the medium of yokes 18, each of said cams rotating in a cam opening or recess formed in the lower enlarged portion of each of said yokes, note particularly Fig. 3. The upper ends of the yokes connect with the cross head 17 through guide blocks or brackets 19 which move vertically in guide brackets or pedestals 20 which are bolted or otherwise suitably secured to side frame members 21, the latter in turn being supported on frame members or pedestals 22 which are mounted on the main frame structure 10. Connected to the under portion of the cross head 17 are a pair of cam trip bars 23 and 23', each of which is formed with an undercut or quick-acting knife-releasing recess 24, the construction of which is best shown in Fig. 3 and the advantages of which will be hereinafter more fully described.

This mechanism just described is reciprocated vertically only and operates to depress and release the knife or cutting mechanism which will now be described.

The cutting mechanism proper comprises a transversely extending knife 25, note particularly Figs. 2 and 3, which is connected along its length to the lower ends of a series of knife-aligning plungers 26 which move vertically in sleeves or guides 27, the latter being connected to or forming part of a horizontally reciprocating cross head or slide member 28, which at opposite ends is mounted on slides to be described. At their upper ends, plungers 26 are connected to a tie bar 29. Connected to the bar 29 are roller brackets 30 provided with rollers 30a, said brackets in turn being connected to knife-operating rods or plungers 31, the latter being adapted to reciprocate vertically in abutment lugs 32 and each having mounted therearound a spring 33, the said springs serving to normally urge the tie bar 29 together with the knife and other parts connected thereto upwardly. The lugs 32, as here shown, are secured to the cross head 28, and the springs 33 are each positioned between adjacent pairs of sleeves 27.

The construction of the knife 25 and the preferred manner in which it is mounted is best shown in Figs. 2 and 3, the upper edge of said knife being connected to the lower ends of the aligning plungers 26 by means of clamp blocks 34, and on each side of the knife is an oiler and wiper assembly comprising felt wipers 35 carried by converging holder brackets 36, which in turn are carried by brackets 37 secured to the cross head 28 by means of bolts 38. Brackets 36 are under adjustable tension by means of screws 38a. It will be seen that the oiler and wiper assembly just described is held against vertical reciprocation with respect to the knife 25 so that the latter reciprocates between the felts 35. These felts or pads are supplied with an odorless and tasteless mineral oil, either by hand or automatically such as by means of an oil reservoir, (not shown) to prevent sticking or adhesion of the knife to the plastic material.

The knife assembly just described is mounted on a carriage arranged to move or reciprocate horizontally, the slide member or cross head 28 which carries this assembly being connected at opposite ends to brackets 40 which in turn are connected to slides 41 adapted to move back and forth in slideways 42 mounted at opposite sides of the machine on the frame member 21. The slides 41 are reciprocated by means of adjustable cam members or cranks, generally indicated at 43, which are connected to the opposite ends of a cam shaft 44, each cam or crank 43 having an operative connection with a connecting yoke or arm 45 which extends forwardly and is pivotally connected to the slide 41 at 46.

The cam members 43 each have a particular construction so that the offset or radial throw thereof may be adjusted within certain limits. Referring to the detailed views in Figs. 5 and 6, each cam member 43 comprises a slotted housing or bracket 43a formed with a hub 43b which is secured on the one end of shaft 44, the slot in the bracket being indicated at 43c. Within the slot 43c is an adjustable slide block 43d, having formed thereon a spindle 43e on which the rear end of yoke or arm 45 is mounted, the outer end of the spindle 43e being threaded to receive a retaining nut 43f. Block 43d is bored and internally threaded to receive an adjusting screw 43g, which at opposite ends projects through the bracket 43a and is provided with a lock nut 43h and adjusted nut 43i. It will be seen that by adjusting the block 43d in the slot 43c, the throw of the cam or crank may be adjusted within certain limits, to thereby adjust the length of horizontal travel or reciprocation of the knife 25. There are certain advantages attained by this construction as will be more fully brought out in the description of operation of the machine.

Shaft 44 is connected to and driven from shaft 11 through the medium of sprockets 47 and 48 and sprocket chain 49.

A roller 50 is positioned under the band 6 at the point where the knife 25 acts on the fig bars, to support the band during the cutting operation.

The machine operates as follows:

To render the description and operation more easily understood, one complete cycle will be divided into four quarters which will be referred to as the first, second, third and fourth quarter, one complete cycle being made upon the completion of each revolution of either of the shafts 11 or 44.

When shaft 44 rotates, the adjustable cam or crank members 43 at opposite ends thereof act on slides 41 and impart horizontal reciprocation to the cross head 28 and the knife assembly carried thereby; while rotation of shaft 11 and cams 16 at opposite ends thereof causes the yokes or connected members 18 to impart vertical reciprocation to the cross head 17 and the trip bars 23 carried thereby. Starting with the position as shown in Fig. 3 as the first quarter of a cycle, in this position the knife is raised ready to move downwardly, and horizontally it is ready to begin the last half of the back stroke. In the first quarter of the cycle, the knife will travel the second half of the back stroke and at the same time it will travel the first half of the down stroke, and during this quarter, the knife operating plungers 26 will not be affected by the recessed portions of the cam bars 23, the rollers 30a at this time traveling on the straight part of the bars.

In the second quarter, the knife 25 will travel the first half of the forward stroke, and during the same time it will travel the last half of its down stroke, the cross head 17 and bars 23 bearing down on the knife-operating plungers 26 and depressing knife 25. The rollers 30a will still travel on the straight part of the bars 23 during this quarter.

In the third quarter, the knife travels the second half of its forward stroke, and during the first part of the cycle roller 30a reaches the offset 24 in cam or trip bar 23, thus causing the knife 25 to be rapidly or sharply withdrawn out of the fig bar. This quick release of the knife from the sticky fig centers is a marked advantage in contradistinction to a relative slow retraction, since it has been found that this quick or sharp retracting movement eliminates initial sticking with a resultant jumping movement of the bar and misalignment thereof on the conveyor band, which misalignment ofttimes causes the bars to jamb. During the first part of this third quarter the cam or trip bars 23 are also raised due to the operation of cams 16, the latter being designed so that the upward movement of the bars 23 is relatively slow at the beginning of the third quarter and increases towards the finish of this quarter. Thus the rollers 30a register with the retraction recess 24 prior to any appreciable withdrawal of knife 25. The combined upward movement of the trip bars 23 and the retracting movement of the knife 25 due to the rollers 30a registering with the arcuate recesses 24 comprise the total vertical upward movement of the knife.

In the fourth quarter, the knife assembly travels the first half of the back stroke, and in this quarter the bars 23 are raised to the limit of upward travel by the action of cams 16. During this same quarter the rollers 30a move out of the arcuate notches 24 and are in the position shown in Fig. 3 ready to repeat the severing operation.

The ease and accuracy with which the horizontal reciprocation of the knife 25 may be adjusted through the medium of the cams 43 will be readily apparent. With the conventional type of cam, it would be extremely difficult to ascertain the exact offset required for a given length of fig bar. The knife moves forward at a variable speed while the fig bars move at a constant rate of speed, and the knife is in the act of cutting through only a portion of its forward movement, and at this time, it is desirable that its speed of forward travel substantially coincides with the speed of travel of the fig bar since otherwise mutilation of the bar will take place. By adjusting the cam 43, coordination of the cutting mechanism with respect to the traveling fig bar to obtain a given length of severed bar is greatly simplified. Due to the fact that the cutting mechanism operates in a certain sense independently of the means for imparting a depressing action or cutting stroke to the said mechanism, this adjustment may be made more readily than where the two move back and forth in unison and are otherwise more or less tied together, nor is the power required in driving the parts as great since there is less momentum to overcome.

The machine as a whole has been found to be eminently satisfactory for the work for which it is adapted, and the construction and arrangement of the parts of the machine as a whole tend towards simplicity and economy in manufacture and ease in installation and operation.

It will be understood that certain changes in the construction, design and arrangement of the several parts may be made within the limits of the invention as defined by the appended claims.

I claim:

1. In a machine for severing plastic material, a horizontally reciprocating carriage, a substantially vertically movable knife mounted on said carriage, means normally urging said knife to a retracted position, and vertically reciprocating means mounted adjacent the path of travel of said carriage and coordinated with the latter and arranged to depress said knife to sever the material, and means for effecting an abrupt retraction of the knife independently of its normal retracting movement to prevent sticking of the material to the knife.

2. In a machine for severing plastic material, a horizontally reciprocating carriage, a vertically movable knife mounted on said carriage, resilient means normally urging said knife to a retracted position, vertically reciprocating members mounted adjacent the path of travel of the carriage and arranged to depress the knife into severing position and release the knife for retraction by said resilient means, said members being contoured to permit an initial abrupt release of the knife by said resilient means after the severing operation.

3. In a machine for severing plastic material during travel thereof, a horizontally reciprocating carriage, a vertically movable knife mounted on said carriage, means normally urging said knife to retracted position, knife-depressing members mounted adjacent the path of travel of the carriage and adapted to depress the knife into severing position, said members having undercut cam recesses therein to permit an initial abrupt release or tripping action of the knife from the material and prevent adherence thereof to the knife.

4. In a machine for severing plastic material during travel thereof, a horizontally reciprocating carriage, a vertically movable knife mounted on said carriage, plungers connected to said knife for carrying and guiding the latter, resilient means normally urging the knife to retracted position, vertically reciprocating trip bars mounted above the path of travel of said plungers and arranged to act on the latter to depress the knife into severing position, said bars being formed with undercut recesses to permit an abrupt initial release of the knife after severance and prevent adherence of the material to the knife.

5. In a machine for severing plastic material during travel thereof, a horizontally reciprocating carriage, a vertically movable spring-return knife mounted on said carriage, knife aligning plungers connected at their lower ends to said knife and extending vertically through guides which are mounted on the carriage, means connecting said plungers for movement in unison, a vertically reciprocating knife-depressing assembly mounted adjacent the path of travel of said carriage but independent of the latter and provided with means arranged to act on said knife to depress the latter into severing position.

6. In combination with a band oven having a band conveyor traveling therethrough and therebeyond and carrying plastic material, means for severing the material into individual lengths comprising a carriage arranged to reciprocate in the plane of travel of the material, a knife mounted on said carriage and extending across the conveyor, means normally urging said knife to a retracted position, means for depressing the knife to effect severance of the material, said latter means being raised after severance to permit retraction of the knife, and means for effecting an initial abrupt retraction of the knife independently of its normal retracting movement to prevent sticking of the material to the knife.

7. In a device of the class described, cutting means, means for causing relative motion of an object to be cut with respect to said cutting means, means for causing motion of said cuting means towards said object to be cut and means for normally retracting said cutting means from said object to be cut, and means for effecting an abrupt retraction of the cutting means independently of its normal retracting movement.

8. In a machine for severing plastic material, a vertical reciprocable knife, a horizontally reciprocating carriage on which said knife is mounted, means normally urging said knife to a retracted position free of the material, and means supported against relative movement horizontally with respect to said carriage and within operative adjacency to the path of travel of the latter for depressing the knife to sever the material, said means having a cam surface contoured to effect an abrupt initial release of the knife after severance of the material.

9. In a machine for severing plastic material, a carriage mounted for horizontal reciprocation, a vertical reciprocable knife mounted on said carriage, means normally urging said knife to a retracted position free of the material, knife depressing members supported against relative movement horizontally with respect to said carriage and within operative adjacency to the path of travel of the latter, said members having an elongated contour terminating in cam portions constructed to effect an abrupt release of the knife after severance of the material.

10. In a machine for severing plastic material during travel thereof, a horizontally movable carriage, a vertically movable knife mounted on said carriage, means for imparting vertical reciprocation to said knife, means arranged to impart horizontal reciprocation to said carriage in the plane of travel of the material including a member connected to said carriage, a rotating cam or crank having a pivotal connection with said member, and means for radially adjusting the pivotal connection of the crank with said connecting member to thereby adjust the throw of the crank and the reciprocatory travel of the carriage.

ROBERT F. LOVELL.